US012711860B2

(12) United States Patent
Carrarini et al.

(10) Patent No.: US 12,711,860 B2
(45) Date of Patent: Aug. 18, 2026

(54) ROAD TELECOMMUNICATIONS SYSTEM

(71) Applicant: ANAS—SOCIETA PER AZIONI, Rome (IT)

(72) Inventors: Luigi Carrarini, Rome (IT); Daniela De Nigris, Rome (IT)

(73) Assignee: ANAS—SOCIETA PER AZIONI, Rome (IT)

( * ) Notice: Subject to any disclaimer, the term of this patent is extended or adjusted under 35 U.S.C. 154(b) by 34 days.

(21) Appl. No.: 18/837,931

(22) PCT Filed: Feb. 13, 2023

(86) PCT No.: PCT/IB2023/051267
§ 371 (c)(1),
(2) Date: Aug. 13, 2024

(87) PCT Pub. No.: WO2023/152714
PCT Pub. Date: Aug. 17, 2023

(65) Prior Publication Data

US 2025/0148909 A1 May 8, 2025

(30) Foreign Application Priority Data

Feb. 14, 2022 (IT) ........................ 102022000002624

(51) Int. Cl.
*G08G 1/0967* (2006.01)
*G08G 1/01* (2006.01)
*G08G 1/017* (2006.01)

(52) U.S. Cl.
CPC ......... *G08G 1/0967* (2013.01); *G08G 1/0116* (2013.01); *G08G 1/0133* (2013.01); *G08G 1/0141* (2013.01); *G08G 1/0175* (2013.01)

(58) Field of Classification Search
CPC .. G08G 1/0967; G08G 1/0116; G08G 1/0133; G08G 1/0141; G08G 1/0175
(Continued)

(56) References Cited

U.S. PATENT DOCUMENTS

2016/0091334 A1* 3/2016 Chakra .............. G01C 21/3617 701/425
2018/0310242 A1* 10/2018 Konishi ................. G08G 1/164
(Continued)

OTHER PUBLICATIONS

Italian Search Report for IT 202200002624 Mailed on Sep. 16, 2022.

(Continued)

*Primary Examiner* — Luis A Martinez Borrero
(74) *Attorney, Agent, or Firm* — Rivka Friedman

(57) ABSTRACT

A road telecommunications system (1) allows to implement smart roads. Local control centres (2) provided with local server systems (21) are implemented for several road segments (110). Wireless access stations (3) are distributed along the road segments (110), and comprising communication modules (31, 32) configured to communicate wirelessly with user mobile devices, on board of vehicles travelling along the road path (100), and with vehicle communication modules, integrated in vehicles. The access stations (3) are in wired signal communication with the respective local server system (21), which manages access to the wireless networks and enables to monitor the plants of the road segment (110). A central server system housed in a remote control centre (6) is in wired signal communication with the local server systems (21) of all the local control centres (2), for monitoring and reconfiguring them.

10 Claims, 4 Drawing Sheets

Figure 1:
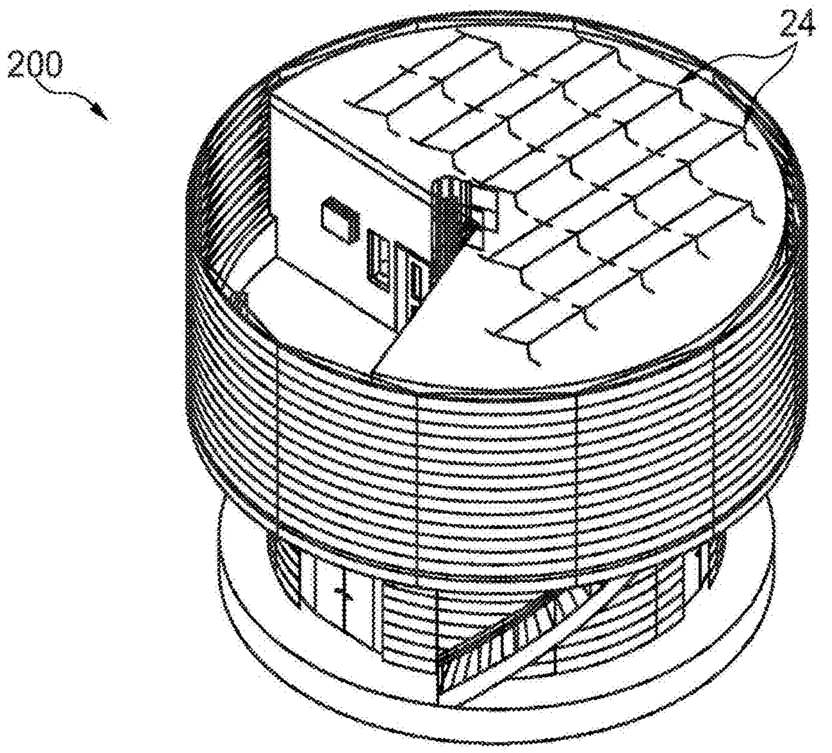

(58) Field of Classification Search
USPC .......................................................... 701/117
See application file for complete search history.

(56) References Cited

U.S. PATENT DOCUMENTS

| | | | | |
|---|---|---|---|---|
| 2019/0244518 | A1* | 8/2019 | Cheng | G08G 1/0145 |
| 2019/0306677 | A1* | 10/2019 | Basu | G08G 1/0112 |
| 2019/0373609 | A1* | 12/2019 | Kim | H04W 72/541 |
| 2019/0387564 | A1* | 12/2019 | Kim | H04W 76/15 |
| 2020/0008044 | A1* | 1/2020 | Poornachandran | H04W 4/024 |
| 2020/0229206 | A1* | 7/2020 | Badic | H04W 28/0226 |
| 2021/0005085 | A1* | 1/2021 | Cheng | G08G 1/012 |
| 2021/0116907 | A1* | 4/2021 | Altman | G05D 1/223 |
| 2021/0385865 | A1* | 12/2021 | Mueck | H04W 74/0875 |
| 2022/0230545 | A1* | 7/2022 | Yoshikawa | G08G 1/052 |
| 2022/0332350 | A1* | 10/2022 | Jha | H04W 4/023 |
| 2022/0383750 | A1* | 12/2022 | Sharma Banjade | G08G 1/005 |
| 2023/0095384 | A1* | 3/2023 | Sharma Banjade | G08G 1/096725 701/301 |
| 2023/0110467 | A1* | 4/2023 | Jha | G08G 1/096791 701/24 |
| 2023/0206755 | A1* | 6/2023 | Jha | G08G 1/005 340/425.5 |
| 2023/0298468 | A1* | 9/2023 | Jha | G08G 1/164 701/117 |
| 2023/0377460 | A1* | 11/2023 | Sivanesan | G08G 1/096775 |
| 2024/0194057 | A1* | 6/2024 | Fei | G01C 21/3461 |
| 2024/0214786 | A1* | 6/2024 | Sharma Banjade | H04W 4/40 |

OTHER PUBLICATIONS

International Search Report for PCT/IB2023/051267 Mailed on Mar. 24, 2023.

* cited by examiner

ROAD TELECOMMUNICATIONS SYSTEM

CROSS-REFERENCES TO RELATED APPLICATIONS

This patent application claims the benefit of Italian Patent Application No. IT102022000002624, filed Feb. 14, 2022, which is incorporated in its entirety as if fully set forth herein.

TECHNICAL FIELD

The present invention relates to a road telecommunications system aimed at implementing smart roads that enable an advanced management of the road traffic and communication with vehicles and their users.

PRIOR ART

To date, the use of road services, such as traffic and safety information and technical assistance, is managed by known media, such as the Internet, radio, signage and emergency stations.

Looking through these information sources may be dispersive for users, whereas it would be desirable to channel them into a single information channel, in addition to those already existing but specific to a single service.

In addition, there is a need to enable information exchanges with vehicles, to provide information not necessarily comprehensible to humans, but useful to the vehicle to implement semi-automatic or fully autonomous driving modes.

US 2019244518 describes a road telecommunications system, wherein communication modules along the road network enable communication with vehicle-integrated communication modules, to share automatic or semi-automatic driving information. In case no pre-installed communication module is installed on a vehicle, a special module may be provided to the driver. In different alternative embodiments, the system described may be based on various possible communication technologies.

SUMMARY OF THE INVENTION

In this context, the technical task underlying the present invention is to meet the above-mentioned needs, and in particular to provide a secure and reliable road telecommunications system, which enables to centralise, by a single infrastructure, access to road services and exchange information directly with the vehicles.

The defined technical task and the specified objects are substantially achieved by a road telecommunications system comprising the technical characteristics set forth in one or more of the appended claims.

The invention provides placing wireless access stations along the road. The stations are provided with network communication modules to enable wireless communication with the respective user mobile devices within the vehicles, or with vehicle-integrated communication modules, within respective coverage areas.

Thus, unlike US 2019244518, two different types of communication coexist, based on distinct communication modules, and are dedicated respectively to the vehicle, for automatic or semi-automatic driving, and to the user mobile devices, in order that contents may be used by the driver or passengers. US 2019244518, on the other hand, makes no reference to communication with user mobile devices, nor to the simultaneous use of two communication technologies on the same road segment.

Groups of access stations, covering a road segment, are connected to respective local control centres, wherein a local server system exchanges information with mobile devices and vehicular communication modules by network communication modules. Local control centres may also provide the access stations with the electric power they need to operate.

A remote control centre comprises a central server system from which the operation of local control centres may be verified.

In advantageous embodiments, the communication channels between local centres and access stations, and between the remote centre and local centres, are formed in loops, to ensure that a branch of the communication line is always available.

In addition, the local control centres are preferably enabled for stand-alone operation, should communication with the remote centre break down.

LIST OF THE FIGURES

Figure 2:
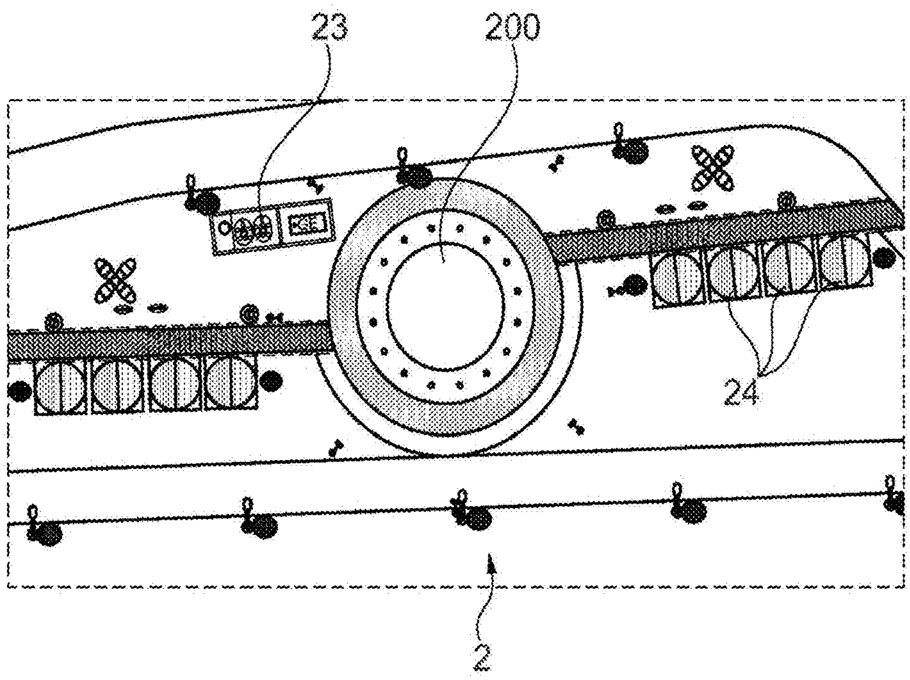
Figure 3:
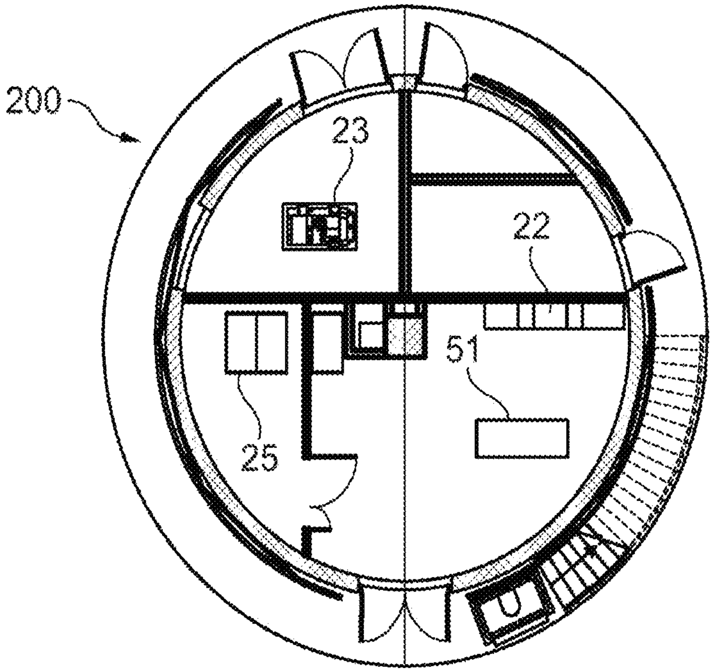
Figure 4:
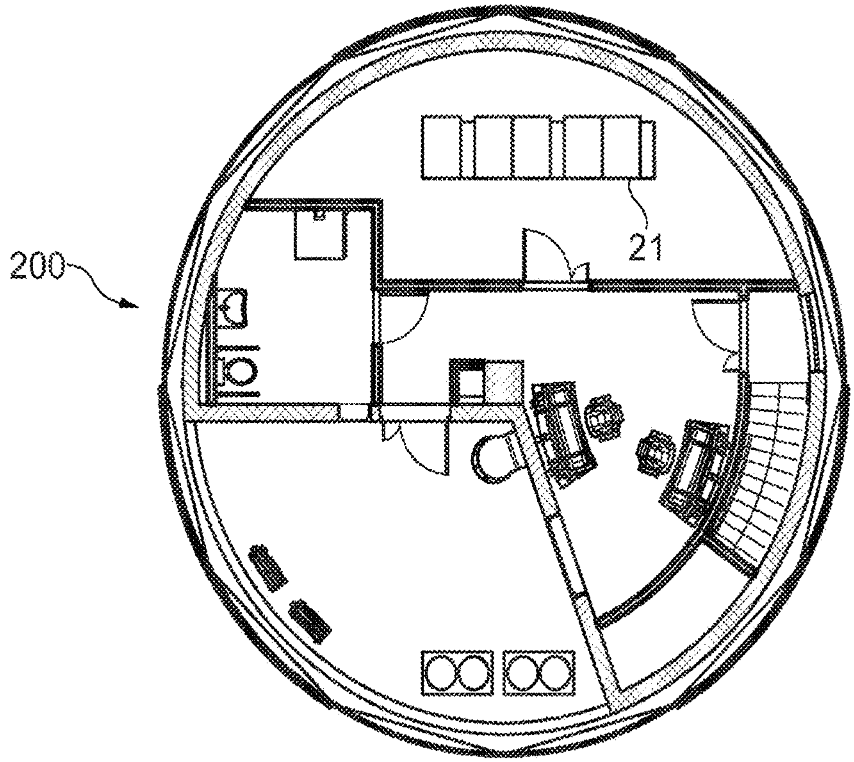
Figure 5:
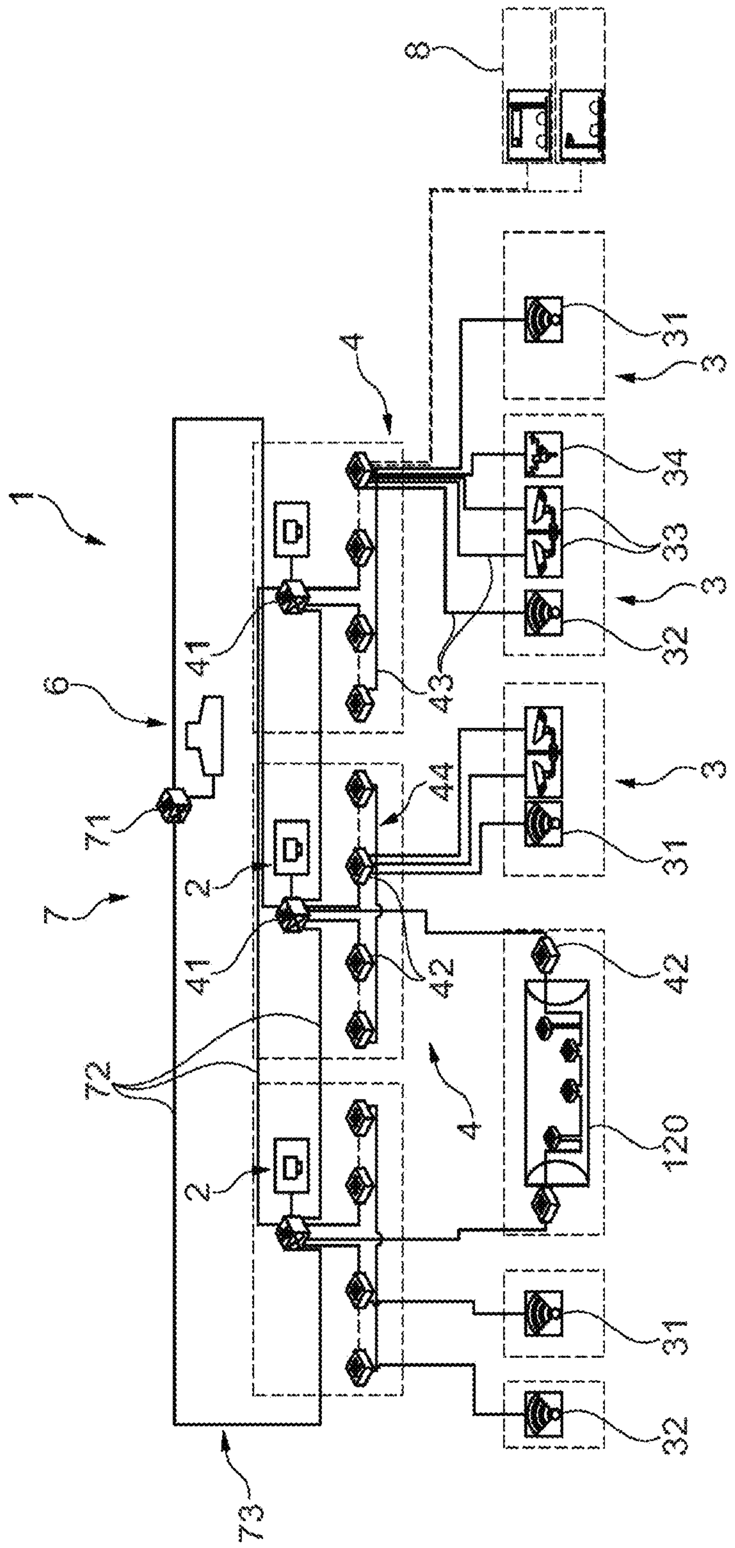
Figure 6:
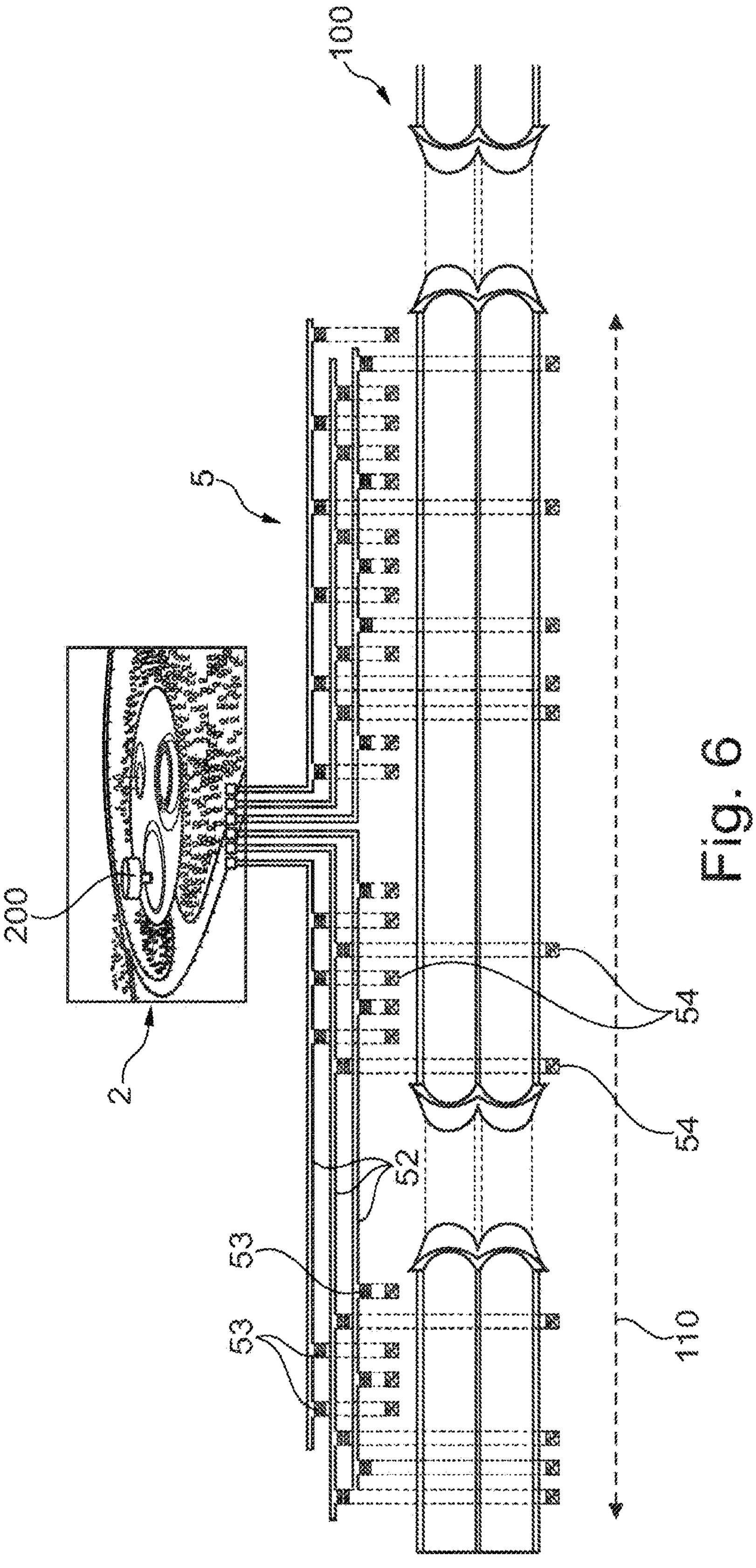

Further characteristics and advantages of the present invention will become more apparent from the approximate and thus non-limiting description of a preferred, but not exclusive, embodiment of the invention, as shown in the accompanying drawings, wherein:

FIG. 1 shows a perspective view of a building for a local control centre of a road telecommunications system according to an embodiment of the invention, FIG. 2 shows a plan view of a local control centre containing the building of FIG. 1, FIGS. 3 and 4 show plan views of two floors of the building of FIG. 1, FIG. 5 schematically shows an example of a telecommunications system data transmission infrastructure according to an embodiment of the invention, FIG. 6 schematically shows an example of a power network for a road segment branching off from a system local control centre according to an embodiment of the invention.

DETAILED DESCRIPTION

The present invention relates to a road telecommunications system 1. The system 1 comprises various equipment distributed throughout the territory, and in particular along a road path 100. Part of the equipment is collected in special buildings 200 for managing the system 1.

The road path 100 may be, for example, but not necessarily, a motorway. In order to manage the system 1, the road path 100 is ideally divided into road segments 110, preferably of substantially uniform lengths, e.g. between 10 and 50 km, preferably between 20 and 30 km. It is worth noting that the segments 110 are not necessarily straight, and may or may not end at discontinuities of the road path, such as crossroads, road junctions or tunnels 120.

The system 1 comprises a plurality of local control centres 2, in particular one local control centre 2 for each road segment 110. Hereinafter, where characteristics of a local control centre 2 and a road segment 110 will be described, they will be intended as applicable to all the local control centres 2 and all the road segments 110.

Each local control centre 2 preferably comprises a dedicated building 200, also known as the Green Island, which may be located alongside the roadway of the path 110. An embodiment of such a building 200 is shown in FIGS. 1 to 4. The building 200, in addition to rooms for housing technical equipment as described hereinafter, may provide rooms intended for offices, control rooms, services, or other working environments. In the example shown, the building 200 has two floors, both of them with a circular plan and larger dimensions for the upper floor than for the lower floor.

The local control centre 2 comprises a local server system 21, comprising one or more servers, for functions that will be described below, which are shown housed on the second floor of the building 200.

The system 1 also comprises a plurality of wireless access stations 3, distributed along the road segments 110 that make up the road path 100, spaced apart, substantially evenly, from each other. In greater detail, for each segment 110 a plurality of access stations 3, which represent a segment group of access stations 3, are provided.

In the preferred embodiments, the access stations 3 are set up with equipment also performing functions independent of wireless communication, as will be discussed hereinafter. Therefore, the access stations 3 may also be called multi-purpose stations. Preferred multi-purpose stations may comprise a pole, with the addition of a manhole and/or a cabinet, and in these structures the equipment described hereinafter is housed. In addition, other optional multi-purpose stations 8 distributed along the road 100 may include equipment for various services, but without wireless communication modules 31, 32. These, however, will not be further described hereinafter.

The access stations 3 comprise wireless communication modules 31, 32. The spacing between access stations can be for instance between 100 and 500 m, preferably between 250 and 300 m, so that signal coverage areas of communication modules 31, 32 cover the entire road segment 110.

The local server system 21 of each local control centre 2 is in wired signal communication with the wireless communication modules 31, 32 of the access stations 3 distributed along the respective road segment 110, i.e. of the segment group of access stations 3.

In greater detail, the system 1 comprises a wired segment data network 4 for each road segment 110, and thus also for each local control centre 2. For each road segment 110, the respective segment data network 4 connects the local server system 21 of the respective local control centre 2 at least to the communication modules 31, 32 of the respective access stations 3.

In the preferred embodiment, each segment data network 4 comprises at least one local router 41 housed in the local control centre 2 and connected to the local server system 21. The local router is configured to connect the local server system 21 with the communication modules 31, 32 of the access stations 3 distributed along the road segment 110.

In greater detail, each segment data network 4 comprises a plurality of switches 42, e.g. one switch 42 per access station 3, connected to at least the communication module 31, 32 of the access station 3. Embodiments in which several access stations 3 have the switch 42 in common are however envisaged. The segment data network 4 also comprises wiring 43, preferably made of optical fibre, connecting the local router 41 with the switches 42, and wiring 43, optionally made of copper, connecting the switches 42 to the respective communication modules 31, 32.

It is advantageous that the wiring 43 of each segment data network 4 forms one or more connection loops 44, so that each access station 3, in particular each switch 42, is connected to the local router 41, and thus to the local server system 21 of the respective local control centre 2, via at least two independent data connection lines. The switches 42 are preferably connected to one or more of these loops 44 in an entry-exit configuration.

The independent connection lines are preferably spaced apart from each other so as to prevent accidental simultaneous interruptions of both the independent lines. For example, the independent connection lines may extend on opposite sides of the road path 100.

It is also advantageous for each local control centre 2 to include at least two local routers 41 in redundant operation.

Thanks to these expedients, the system 1 may remain in service even in the event of various types of failures in a local router 41, switch 42, or wiring 43, diverting data traffic to alternative communication channels.

Preferably, the access stations 3 are also configured, via the communication modules 31, 32, for wireless communication between separate access stations 3, in particular adjacent access stations 3, in order to create additional alternative communication channels in the event of an interruption of the wired connection to the respective local server system 21, either intended as a physical interruption of the wired connection, or as a signal interruption on the wired connection.

In parallel to the segment data networks 4, in the preferred embodiment, the system 1 comprises a wired segment power network 5 for each road segment 110, which is connected to the access stations 3 distributed along the segment 110 in such a way as to power supply the access stations 3.

In detail, each local control centre 2 comprises an electrical delivery point 22, located in the building 200, for the connection to an electrical distribution network (not shown). The segment power network 5 is connected to the delivery point 22 and preferably comprises, at the delivery point 22, a step-up transformer 51, configured to raise the voltage from a first value, equal to the distribution network voltage (e.g. 400V, three-phase AC), to a second value, greater than the first one (e.g. 1000 V, single-phase or three-phase).

In addition to the delivery point 22, the local control centre 2 comprises one or more electric power generators 23, 24, preferably including at least one engine-generator set 23, either inside or outside the building 200, and a renewable electric power source-based plant 24, such as a photovoltaic plant on the roof of the building 200, or alongside the building 200, or a wind power plant alongside the building 200. Preferably the local control centre 2 also includes an uninterruptible power supply 25, which may be housed in the building 200. These devices allow continuity of operation and/or energy self-sufficiency of the local control centres 2.

The segment power network 5 comprises electric power lines 52 connecting the delivery point 22 (and in particular the step-up transformer 51), as well as the electric power generators 23, 24 and the uninterruptible power supply 25, where provided, to the access stations 3 so as to power supply the access stations 3.

In the preferred embodiment, each access station 3 comprises a step-down transformer 53 and a rectifier 54, configured to step down the voltage from the second value to a third value (e.g. 24 or 48 V), which is lower than the second value, and convert it to direct current. At the access station 3, electrical connections supply the third voltage value to the communication modules 31, 32 and to any other equipment of the access station 3.

According to one aspect of the invention, the wireless communication modules 31, 32 of the access stations 3 comprise different types of communication modules, and in particular first communication modules 31 and second communication modules 32. The power supply and signal connections described insofar apply both to the first and second communication modules 31, 32.

The first communication modules 31 are configured to transmit wireless signals in first coverage areas, and for the wireless communication in the first coverage areas with users' electronic mobile devices, on-board vehicles travelling along the road path.

The second communication modules 32 are configured to transmit wireless signals in second coverage areas, and for the wireless communication in the second coverage areas with electronic vehicular communication modules, which are integrated within the vehicles travelling along the road path.

The vehicular communication modules are vehicle-mounted electronic units, usually electrically connected to a vehicle central processor. Conversely, mobile user devices, or mobile computers, are computers designed to be used by the user without constraints on their location, such as at least one of mobile phones, palmtops, smartphones, tablets, smart watches and smart glasses. They may also be temporarily in signal communication with the vehicle processor, but this is not necessary for their operation.

It is worth noting that each access station 3 may comprise only one, any of them, of the two aforementioned types of communication modules 31, 32, or both types. The arrangement of the first and second communication modules 31, 32 is such that first adjacent coverage areas entirely cover the respective road segment 110, and similarly second adjacent coverage areas entirely cover the respective road segment 110. Independent communications can take place simultaneously with user mobile devices and vehicular communication modules in the same vehicle.

In particular, in the light of the current typical size of the coverage areas of these types of wireless communication modules 31, 32, it is preferable that each access station 3 includes at least a first communication module 31, while only some access stations 3 additionally comprise a second communication module 32. Thus, the first communication modules 31 may be spaced apart from each other between 100 and 500 m, preferably between 250 and 300 m, while the second communication modules 32 can be spaced apart from each other between 200 and 1500 m, preferably between 600 and 900 m.

In the preferred embodiment, the first communication modules 31 are configured to provide to the user mobile devices an access to a road service Intranet. Alternatively, the first communication modules 31 may provide to a user mobile devices an access to the Internet. Preferably, the technology used for communication between the first communication modules 31 and the user mobile devices is Wi-Fi in Motion technology (IEEE 802.11 a/b/g/n standard).

As is generally the case with Wi-Fi technology, a single user device provided with a single antenna may remain connected to a single access point of a Wi-Fi network, given, in the present case, by a single first communication module 31. The access point selection is traditionally carried out by the user mobile device ("Client Oriented" approach). When the access point is changed, the connection is temporarily interrupted, which would be a problem on a vehicle, which can quickly pass through first coverage areas of several first communication modules 31.

Conversely, the Wi-Fi in Motion technology requires that the access point, to which the user mobile device must remain connected, is selected by the network ("Network Oriented" approach).

In particular, one of the functions carried out by the local server system 21 of a local control centre is to periodically receive from the first communication modules 31 values of wireless signal powers exchanged with the user mobile devices. Therefore, the local server system 21 is configured to select a respective access point for each mobile device, selected from the first communication modules 31 based on signal power values. The Wi-Fi connection is then established between the selected first communication module 31 and the mobile device.

The local server system 21 is then configured to dynamically change the first communication modules 31 to be selected, one at a time, as access points to establish the Wi-Fi connection with that mobile device, always depending on the signal power values as they progressively vary during the vehicle motion.

As described hereinafter, the local server systems 21 of several local control centres 2 are also in signal communication with each other. Advantageously, when a vehicle passes between two road segments 110, the local server systems 21 of the two segments are configured to coordinate with each other in dynamically changing the first communication modules 31 to be selected as access points for each mobile device.

These access point changes do not result in interruptions in the Wi-Fi connection between the mobile device and the Intranet, i.e. with the local server system 21, at least up to a predetermined maximum speed, e.g. of 130 km/h.

Thanks to the connection of the mobile devices to the Intranet via the first communication modules 31, the local server system 21 is configured to deliver road services such as consultation and notification, via the mobile device, optionally in hands-free mode, of road information such as traffic information, alternative paths, weather conditions, and dangerous situations. In addition, the local server system 21 is configured to request and receive sensor information collected by mobile devices via integrated sensors, such as accelerometer, gyroscope, magnetometer, proximity sensor, barometer, light sensor, thermometer, humidity sensor and pedometer. In addition, the local server system 21 is configured to receive requests and alerts that may be entered via mobile devices by the user, such as roadside assistance requests and emergency alerts.

Still thanks to the information gathered by the first communication modules 31, each local server system 21 may be advantageously configured to locate the user mobile devices along the respective road segment 110. Localisation may be carried out at a first level on the basis of the first communication module 31 connected to the mobile device, which allows the local server system 21 to determine that the user mobile device is within the relative first coverage area. Furthermore, localisation may be carried out at a more accurate level thanks to signal triangulations between the mobile device and the first communication modules 31, and to the sensor data collected and transmitted by the mobile device.

Thanks to localisation, the local server system 21 may be configured to determine the speed of the vehicle in which the mobile device is located, to recognise stationary vehicle conditions, and to reconstruct traffic flows.

The second communication modules 32 are configured to exchange information related to smart transport systems, such as semi-automated or autonomous driving data, with the vehicular communication modules. Preferably, the second communication modules 32 are configured to support one or more different communication technologies known to be used for that purpose, such as Dedicated Short Range Communications (DSRC, ETSI IST-G5 and IEEE 802.11.p standards), or Cellular-Vehicle to Everything (C-V2X, based on 4G LTE or 5G) communication technologies.

In the preferred embodiment, the access stations 3 (all or some of them), in addition to the first and second communication modules 31, 32 comprise cameras 33 oriented towards the road path 100 and configured to identify vehicles on the road path 100, e.g. by reading number plates. The cameras 33 may be configured to perform safety and/or supervisory functions, including the detection of stationary vehicles, accidents, pedestrians, wrong-way vehicles, obstacles on the road, and the recognition of predetermined traffic and visibility conditions.

The cameras 33 may be connected to segment data networks 4 and segment power networks 5 according to modes already described for the first and second communication modules 31, 32. The cameras 33, in particular, are in signal communication with the local server systems 2.

In addition, the access stations 3 may comprise climate stations 34, connected for power supply and signal communication according to the modes already described for the first and second communication modules 31, 32.

To summarise, among the functions that may be performed in the local server system 21, by one or more separate servers, there are wireless network controller functions, performed by controlling the first and second communication modules 31, 32, mobile device location functions, camera 33 management functions, but also functions for monitoring and reconfiguring the respective segment data network 4 and segment power network 5.

According to one aspect of the invention, the system 1 comprises a remote control centre 6, preferably near the road path 100. The remote control centre 6 may comprise a dedicated building, not shown.

The remote control centre 6 comprises at least one central server system, housed in the appropriate building. The central server system is in wired signal communication with the local server systems 21 of all the local control centres 2.

In particular, the system 1 comprises a wired data backbone 7, preferably made of optical fibres, connecting together the local server systems 21 of all the local control centres 2 to the central server system.

In greater detail, the data backbone 7 comprises a central router 71 housed in the remote control centre 6 and connected to the central server system. The central router 71 is preferably modular and highly reliable. In addition, the data backbone 7 comprises wiring 72 connecting the central router 71 to the local routers 41.

Similarly to the segment data networks 4, the wiring 72 of the data backbone 7 forms one or more connection loops 73 so that each local server system 21 is connected to the central server system via at least two independent data connection lines. Preferably, the local routers 41 are connected to the connection loops 73 in an entry-exit mode.

The central server system is configured to monitor the operation status and to reconfigure in a centralised way, local server systems 21 as well as access stations 3, of the segment data networks 4, segment power networks 5 and data backbone 7.

In any case, for maximum reliability of the system 1, each local server system 21 is preferably configured for standalone operation in the event of disconnection from the central server system, i.e. of signal interruptions and/or physical interruptions of the data backbone 7.

The invention claimed is:

1. A road telecommunications system, comprising:

a plurality of wireless access stations distributed along a plurality of road segments that make up a road path, the access stations comprising:

first communication modules, configured for wireless communication with user mobile devices, on board of vehicles travelling along the road path and located within respective first coverage areas, and second communication modules, configured for wireless communication with vehicular communication modules, integrated in vehicles travelling along the road path and located within respective second coverage areas, wherein, for each road segment, the arrangement of the respective first and second communication modules is such that the respective first coverage areas, adjacent to each other, entirely cover the road segment, and the respective second coverage areas, adjacent to each other, entirely cover the road segment, a local control centre for each road segment, each local control centre comprising at least one local server system, in wired signal communication with the first and second communication modules of the access stations distributed along the respective road segment, so as to exchange data with the user mobile devices and vehicular communication modules via the first and second communication modules, wherein, the system comprises a wired segment data network for each road segment connecting the local server system of the local control centre of the respective road segment to the first and second communication modules of the access stations distributed along the respective road segment, a wired data backbone connecting the local server systems of all the local control centres to each other and to the central server system, a remote control centre, comprising at least one central server system in wired signal communication with the local server systems of all the local control centres, the central server system being configured to monitor an operating state of the local server systems, wherein each segment data network forms one or more connection loops, such that each access station is connected to the local server system of the local control centre of the respective road segment via at least two independent data connection lines, and the data backbone forms one or more connection loops, so that each local server system is connected to the central server system via at least two independent data connection lines.

2. The system according to claim 1, wherein the first communication modules are configured for wireless communication with user mobile devices, which are mobile computers of which at least one is selected from a mobile phone, a palmtop, a smartphone, a tablet, a smart watch and smart glasses.

3. The system according to claim 1, wherein:

the first communication modules are configured to provide, to the user mobile devices, access to an Intranet of road services, preferably via Wi-Fi in Motion technology, the second communication modules are configured to exchange semi-autonomous or autonomous driving data with the vehicle communication modules, preferably via dedicated short-range communication (DSRC), or Cellular-Vehicle to Everything (C-V2X) technology.

4. The system according to claim 1, wherein each local server system is configured to:

receive from the first communication modules wireless signal power values exchanged with the user mobile devices, and select and dynamically change according to said signal power values, for each user mobile device, first communication modules, one at a time, as access points to establish a Wi-Fi connection.

5. The system according to claim 1, wherein each local server system is configured to locate the user mobile devices along the respective road segment.

6. The system according to claim 1, wherein the wired segment data network and the wired data backbone are made of optical fibre.

7. The system according to claim 1, wherein:

each local control centre comprises an electrical delivery point for connection to an electrical distribution network, and one or more electric power generators, preferably including at least one engine-generator set and a renewable source-based plant, the system comprises a wired segment power network for each road segment, each segment power network connecting the delivery point, and each generator of the local control centre of the respective road segment, to the access stations distributed along the respective road segment, so as to power supply the access stations.

8. The system according to claim 1, wherein:

each local server system is configured for stand-alone operation when disconnected from the central server system, and each access station is configured for wireless communication with at least one adjacent access station in the event of an interruption of the wired connection to the local server system of the respective local control centre.

9. The system according to claim 1, wherein each local control centre comprises two local routers in redundant operation, each configured to connect the respective local server system with the first and second communication modules of the access stations distributed along the respective road segment.

10. The system according to claim 1, wherein the access stations comprise cameras configured to identify vehicles on the road path.

* * * * *